United States Patent [19]

Croft

[11] Patent Number: 5,688,860
[45] Date of Patent: Nov. 18, 1997

[54] POLYURETHANE/POLYUREA ELASTOMERS

[75] Inventor: Thomas Stone Croft, Austin, Tex.

[73] Assignee: Minnesota Mining and Manufacturing Company, St. Paul, Minn.

[21] Appl. No.: 572,384

[22] Filed: Dec. 14, 1995

Related U.S. Application Data

[63] Continuation of Ser. No. 904,841, Jun. 26, 1992, abandoned.

[51] Int. Cl.$^6$ .................... C08K 5/01; C08K 5/10; C08K 5/51; C08G 18/69

[52] U.S. Cl. ............... 524/710; 521/56; 521/59; 521/76; 521/122; 523/218; 523/219; 524/66; 524/127; 524/270; 524/306; 524/312; 524/313; 524/315; 524/474; 524/476; 524/481; 524/485; 524/590; 524/705; 524/764; 524/773; 524/874; 524/284; 525/123; 525/125; 525/126; 525/130; 525/131; 525/329.3; 525/331.9; 525/332.8; 525/332.5; 525/333.2; 525/440; 525/455; 528/55; 528/75; 528/85

[58] Field of Search ............... 521/56, 59, 76, 521/122; 523/218, 219; 528/55, 75, 85; 525/123, 125, 126, 130, 131, 440, 455, 329.3, 331.9, 332.5, 332.8, 333.2; 524/874, 773, 764, 705, 66, 270, 710, 127, 284, 306, 315, 312, 313, 474, 481, 485, 476, 590

[56] References Cited

U.S. PATENT DOCUMENTS

| | | | |
|---|---|---|---|
| 3,256,213 | 6/1966 | Gmitter et al. | 521/112 |
| 3,892,820 | 7/1975 | Goto et al. | 524/726 |
| 3,979,364 | 9/1976 | Rowton | 528/76 |
| 4,082,702 | 4/1978 | Harper | 428/308 |
| 4,242,415 | 12/1980 | Feltzin et al. | 525/440 |
| 4,269,945 | 5/1981 | Vanderhider et al. | 521/159 |
| 4,295,909 | 10/1981 | Baccei | 525/126 |
| 4,298,701 | 11/1981 | Meyborg et al. | 528/76 |
| 4,324,867 | 4/1982 | Patton, Jr. et al. | 528/76 |
| 4,346,205 | 8/1982 | Hiles | 528/76 |
| 4,463,155 | 7/1984 | Kibler | 528/61 |
| 4,476,258 | 10/1984 | Hiles | 528/53 |
| 4,722,946 | 2/1988 | Hostettler | 521/158 |
| 4,743,650 | 5/1988 | Boutni | 525/131 |
| 4,769,435 | 9/1988 | Lunardon et al. | 528/75 |
| 4,808,636 | 2/1989 | Saito et al. | 528/76 |
| 4,822,827 | 4/1989 | Bonk et al. | 528/85 |
| 4,833,176 | 5/1989 | Wolf et al. | 521/160 |
| 4,876,292 | 10/1989 | Milliren | 521/159 |
| 4,883,837 | 11/1989 | Zabrocki | 525/125 |
| 4,910,231 | 3/1990 | Pham et al. | 521/159 |
| 4,916,173 | 4/1990 | Otoski et al. | 528/77 |
| 4,980,386 | 12/1990 | Tiao et al. | 521/108 |
| 5,028,684 | 7/1991 | Neuhaus et al. | 528/77 |
| 5,034,435 | 7/1991 | Squiller et al. | 523/415 |
| 5,043,360 | 8/1991 | Pham et al. | 521/159 |
| 5,053,465 | 10/1991 | Waddill | 525/528 |
| 5,061,749 | 10/1991 | Ito et al. | 524/850 |
| 5,064,494 | 11/1991 | Duck et al. | 156/273.5 |
| 5,079,325 | 1/1992 | Kano et al. | 528/45 |
| 5,100,926 | 3/1992 | Kondo et al. | 528/61 |
| 5,101,117 | 3/1992 | Herrington et al. | 521/159 |
| 5,114,982 | 5/1992 | Mendelsohn et al. | 528/76 |

FOREIGN PATENT DOCUMENTS

| | | | |
|---|---|---|---|
| 0288067A1 | 10/1988 | European Pat. Off. | C08G 18/66 |
| 0353785 | 2/1990 | European Pat. Off. | C08G 18/00 |
| 0353786 | 2/1990 | European Pat. Off. | C08G 18/00 |
| 0355000 | 2/1990 | European Pat. Off. | C08G 18/10 |
| 0362647A1 | 4/1990 | European Pat. Off. | C08G 18/65 |
| 0421220A2 | 4/1991 | European Pat. Off. | C08G 18/00 |
| 7-93781 | 12/1989 | Japan . | |

*Primary Examiner*—Rabon Sergent
*Attorney, Agent, or Firm*—Darla P. Neaveill

[57] ABSTRACT

Polyurethane/urea elastomers having an isocyanate equivalent index below 100, preferably from about 15 to about 80; containing an effective amount of polyisocyanate component, and an effective amount of an isocyanate reactive component comprising at least one polyamine and at least one polyol, wherein said elastomer contains from about 1 to about 199 equivalent percent amine per isocyanate equivalent.

13 Claims, No Drawings

POLYURETHANE/POLYUREA ELASTOMERS

This is a continuation of Application No. 07/904,841 filed Jun. 26, 1992 now abandoned.

BACKGROUND OF THE INVENTION

1. Field of the Invention

The invention relates to polymeric elastomers which can be used as encapsulants, sealants, end seals, gaskets, and dams for telecommunications and electrical devices.

2. Description of the Related Art

Elastomers and sealants containing polyurethanes and polyurethane/ureas are well known in the art.

U.S. Pat. No. 5,064,494, (Duck, et al.) discloses a sealant composition made from a polyol based isocyanate prepolymer and a heat activatable blocked complexed amine. The materials are cured by briefly heating to above 120° C. and subsequently moisture cured.

U.S. Pat. No. 5,061,749 (Ito and Hayashi) discloses a polyol based isocyanate prepolymer and a vinyl polymer containing a hydrolyzable siloxy group. The material is stated to be useful as a sealing material when formulated with proper fillers and plasticizers.

U.S. Pat. No. 5,053,465 (Waddill) discloses sealers comprising a polyol based blocked isocyanate prepolymer epoxy resin blend cured with a polyether polyamine.

U.S. Pat. No. 5,034,435 (Squiller) discloses aqueously dispersed polyol based blocked isocyanate-terminated prepolymer epoxy compositions which are mixed with aliphatic polyamines to form a sealant.

U.S. Pat. No. 4,346,205 (Hiles) discloses energy-absorbing polyurethane foams and elastomer compositions having low compression characteristics comprising a flexible polyurethane of essentially linear structure containing unsaturated hydroxyl groups. The foams are the reaction product of substantially linear polyols having hydroxyl end groups and an aromatic isocyanate in less than stoichiometric amount. The elastomers are taught to have a Shore OO hardness of 50 or less.

U.S. Pat. No. 4,476,258 (Hiles) discloses polyurethane elastomer compositions having a density from about 0.4 to about 1 gm/cc, a compression set of less than about 5%, and a recovery time of from about 10 to about 100 milliseconds. The elastomers are formed by reaction of a urethane-forming component containing at least four urethane-forming reactive sites and an elasticizing polyol selected from diols and triols and a diisocyanate in less than stoichiometric amounts. The materials are stated to have a Shore OO hardness of about 20 to about 70. Various additives and fillers are disclosed including hollow glass spheres.

U.S. Pat. No. 4,722,946, (Hostettler) discloses non-liquid, energy-absorbing polyurethane foams and elastomers which are derived from reacting a mixture of linear and branched polyols having a linear to branched ratio of 1.0 to about 1.18, a polyisocyanate and, optionally, a blowing agent, under polyurethane-forming conditions at an isocyanate index of from about 65 to about 85. It is specifically stated that isocyanate indices below 65 do not give a product with useful consistency. It is further disclosed that the elastomers disclosed in the above Hiles patents could not be duplicated, but provided liquid materials which are not usable for the purposes intended.

U.S. Pat. No. 4,980,386 (Tiao and Tiao) discloses a method for the manufacture of shock attentuating low rebound polyurethane foams in which polyols are reacted with polyisocyanates having a functionality of at least 2.3 at an isocyanate index of from about 65 to about 85.

U.S. Pat. No. 5,010,117 (Herrington, et al.) discloses that polyurethane/polyurea foams prepared using polymer polyols with low levels of mono-functional impurities and water as the blowing agent provide improved mechanical properties. Useful polyisocyanate indices were disclosed to be 60 to about 200, preferably about 95 to about 110. It was specifically stated that with lower indices, insufficient curing occurs, which causes the foam to have poor properties.

U.S. Pat. No. 4,833,176 (Wolf and Kogelnik) discloses a process for the preparation of flexible polyurethane foams at an isocyanate index below 70, preferably 40–60, with 5–15 parts water and compounds containing at least two isocyanate reactive compounds.

It has now been discovered that useful viscoelastic elastomers can be obtained at isocyanate indices below 65 and even at extremely low isocyanate indices, e.g., 15 to 50, when a polyamine is included in the isocyanate reactive mixture. Surprisingly, useful elastomers can be produced with a completely branched, or a completely linear isocyanate reactive component as well as a mixture of linear and branched materials. It has also been surprisingly discovered that certain physical properties can be maintained or even increased as the isocyanate index decreases by a proper balancing of the nature and reactivity of the isocyanate reactive component. By balancing these factors, and including at least one polymeric amine, elastomers may be prepared having viscoelastic characteristics ranging from firm elastomers to jelly-like sealants, as desired for varying applications.

SUMMARY OF THE INVENTION

The invention provides polyurethane/urea elastomers having an isocyanate equivalent index below 100, preferably from about 15 to about 80, containing an effective amount of polyisocyanate component, and an effective amount of isocyanate reactive material, comprising at least one polyamine and at least one polyol, wherein said elastomer contains from about 1 to about 199 equivalent percent active amine hydrogen per isocyanate equivalent. The elastomers are useful as encapsulants, sealants, end seals, gaskets and the like.

Suitable polyols and polyamines have molecular weights of from about 400 to about 100,000, preferably from about 400 to about 20,000, most preferably from about 800 to about 6,000. Useful polyamines may have primary or secondary amine groups. Useful polymer polyols contain high molecular weight polyadducts or polycondensates, or polyhydroxyl compounds modified by vinyl polymerization can also be utilized. Suitable polymer polyols contain from about 5 to about 60 percent polymer dispersions in polyols.

Preferred elastomers of the invention also contain lightweight microspheres, preferably from about 10 to about 60 volume percent.

As used herein, these terms have the following meanings.

1. The term "elastomer" refers to a rubbery material which, when deformed, will return to approximately original dimensions in a relatively short time.

2. The term "isocyanate index" and "NCO-index" as used herein refer to the ratio of NCO groups over reactive hydrogen atoms present in a polyurethane formulation given as a percentage:

$$NCO-\text{index} = \frac{(NCO)}{(\text{active hydrogen})} \times 100$$

In other words, the NCO-index expresses the percentage of isocyanate actually used in a formulation with respect to the amount of isocyanate theoretically required for reacting with the amount of isocyanate reactive hydrogen used in a formulation.

The expression "active hydrogen atoms" as used here for the purpose of calculating the isocyanate index refers to the total of hydroxyl and amine hydrogen atoms present in the reactive compositions in the form of polyols and polyamines. This means that for the purpose of calculating the isocyanate index one hydroxyl group is considered to comprise one active hydrogen and one primary amine group is considered to comprise two active hydrogens. The Zerewitnoff test used to determine active hydrogen is described in *Journal of the American Chemical Society*, Volume 49, page 3181 (1927).

3. The term "isocyanate reactive material" means a compound or blend of compounds containing active hydrogen atoms.

4. The terms "equivalent weight" and "molecular weight" as used throughout the present specification refer to equivalent weight values that may be calculated by measuring the content of functional groups per weight of sample, and the molecular weight values that may be calculated from the aformentioned equivalent weight and the theoretical functionality of the compound (i.e., by the total number of hydrogen atoms attached to an oxygen atom and/or a nitrogen atom).

5. The term "polyol" means a substance containing at least two hydroxyl groups attached to a single molecule.

6. The term "polyamine" means a substance containing at least two primary or secondary amino groups attached to a single molecule.

7. The term "essentially inert" as used herein means that the plasticizer does not become cross-linked into the polyurethane/polyurea reaction product.

8. The term "non-exuding" as used herein means that the plasticizer has the ability to become and remain blended with the polyurethane/polyurea reaction product. Many excellent plasticizers experience some blooming, or a slight separation from the solid, especially at higher temperatures, and over lengthy storage times. These plasticizers are still considered to be "substantially non-exuding".

Percents, ratios and parts described herein are by weight unless otherwise specifically stated.

DETAILED DESCRIPTION OF THE INVENTION

Useful organic elastomers comprise at least one isocyanate component. Suitable isocyanate components include any isocyanate having the required functionality. The isocyanate should be present in sufficient amount to provide an isocyanate index of below about 100, more preferably below about 80. Equivalents for each component can be calculated by dividing the actual weight (in parts) of each component by the equivalent weight. The isocyanate reactive component is a blend of compounds containing isocyanate reactive groups, the blend including at least one polyamine and at least one polyol, and may be completly linear, completely branched or a mixture thereof.

The term isocyanate also includes isocyanate-terminated prepolymers. Polyisocyanates may be linear or branched, aliphatic, cycloaliphatic, araliphatic, heterocyclic or aromatic, or any combination of such polyisocyanates. Particularly suitable polyisocyanates correspond to the formula $$Q(NCO)_n$$

in which n is an integer of from about 2 to about 4, and Q is selected from an aliphatic hydrocarbon radical containing from about 2 to about 100 carbon atoms, and zero to 50 heteroatoms; a cycloaliphatic hydrocarbon radical containing from 4 to 100 carbon atoms and zero to 50 heteroatoms; an aromatic hydrocarbon radical or heterocyclic aromatic radical containing from 6 to 15 carbon atoms and zero to 10 heteroatoms, and an araliphatic hydrocarbon radical containing from 8 to 100 carbon atoms and zero to 50 heteroatoms. The heteroatoms that can be present in Q include non-peroxidic oxygen, sulfur, non-amino nitrogen, halogen, silicon, and non-phosphino phosphorus.

Examples of polyisocyanates include ethylene diisocyanate, 1,4-tetramethylene diisocyanate, 1,6-hexamethylene diisocyanate, trimethylhexamethylene diisocyanate, 1,12-dodecane diisocyanate, cyclobutane-1,3-diisocyanate, cyclohexane-1,3 and 1,4-diisocyanate and mixtures thereof, 1-isocyanato-3,3,5-trimethyl-5-isocyanatomethyl cyclohexane (German Auslegeschrift No. 1,202,785, U.S. Pat. No. 3,401,190), 2,4- and 2,6-hexahydrotolylene diisocyanate and mixtures thereof, hexahydro-1,3 -and/or -1,4-phenylene diisocyanate, hexahydro-2,4'-and/or 4,4'-diphenylmethane diisocyanate, 1,3-and 1,4-phenylene diisocyanate, 2,4- and 2,6-tolylene diisocyanate and mixtures thereof, diphenylmethane-2,4'- and/or 4,4'-diisocyanate, naphthylene-1,5-diisocyanate, $C_{36}$ dimer acid diisocyanate (DDI) and the reaction products of four equivalents of the aforementioned isocyanate-containing compounds with compounds containing two isocyanate-reactive groups.

Also useful are e.g., triphenyl methane-4,4',4"-triisocyanate, polyphenyl polymethylene polyisocyanates of the type obtained by condensing aniline with formaldehyde, followed by phosgenation, (British Pat. Nos. 874,430 and 848,671), m- and p-isocyanatophenyl sulphonyl isocyanates (U.S. Pat. No. 3,454,606), perchlorinated aryl polyisocyanates (U.S. Pat. No. 3,277,138), polyisocyanates containing carbodiimide groups (U.S. Pat. Nos. 3,152,162, 4,088,665 and 4,344,855), norbornane diisocyanates (U.S. Pat. No. 3,492,330), polyisocyanates containing allophanate groups (British Pat. No. 994,890, Belgian Pat. No. 761,626 and U.S. Pat. No. 3,769,318), polyisocyanates containing isocyanurate groups (U.S. Pat. Nos. 3,001,973, and 3,738,957, German Pat. Nos. 1,022,789, 1,222,067 and 1,027,394, and German Offenlegungsschrift No. 1,929,034), polyisocyanates containing urethane groups (Belgian Pat. No. 752,261 and U.S. Pat. Nos. 3,394,164 and 3,644,457), polyisocyanates containing acrylated urea groups (U.S. Pat. No. 3,517, 039), polyisocyanates containing biuret groups (U.S. Pat. Nos. 3,124,605, and 3,201,372 and British Pat. No. 889, 050), polyisocyanates produced by telomerization reactions (U.S. Pat. No. 3,654,106), polyisocyanates containing ester groups (British Pat. Nos. 964,474 and 1,072,956, U.S. Pat. No. 3,567,763 and German Pat. No. 1,231,688), reaction products of the above-mentioned diisocyanates with acetals (German Patent No. 1,072,385), polyisocyanates containing polymeric fatty acid esters (U.S. Pat. No. 3,455,883), and araliphatic polyisocyanates (U.S. Pat. No. 4,051,166).

Also useful are distillation residues having isocyanate groups obtained in the commercial production of isocyanates, optionally in solution in one or more of the above-mentioned polyisocyanates. It is also possible to use mixtures of any of the above-mentioned polyisocyanates.

Preferred polyisocyanates include hexamethylene diisocyanate, the isocyanurate and the biuret thereof; 1-isocyanato-3,3,5-trimethyl-5-isocyanatomethyl cyclohexane (isophorone diisocyanate); the tolylene diisocyanates and isocyanurates thereof; the mixed isocyanurate of tolylene diisocyanate and hexamethylene diisocyanate; the reaction product of 1 mol of trimethylol propane and 3 mols of tolylene diisocyanate, crude diphenyl methane diisocyanate, dimer acid diisocyanate (DDI) and 4,4'-methylene-bis (cyclohexyl diisocyanate).

The blocking of polyisocyanates with phenols, acetoacetic ester, diethyl malonate, butanone oxime, epsilon caprolactam and others is a procedure which is well known for the temporary retardation of the reaction between polyisocyanates and active hydrogen containing compounds. The starting polyisocyanates used for the preparation of the blocked polyisocyanates include organic polyisocyanates having an average molecular weight of about 200 to about 25,000. These polyisocyanates include derivatives of monomeric organic polyisocyanates, in particular derivatives containing biuret, isocyanurate and/or urethane groups. The derivatives are preferably isocyanate group-containing prepolymers which can be obtained, for example, by the reaction of relatively high molecular weight polyhydroxyl compounds with di- or polyisocyanates. Suitable starting compounds for the preparation of such prepolymers include low molecular weight polyether or polyester polyols. Preferred starting materials are the polyhydroxyl compounds having a molecular weight of 300 to about 20,000, preferably 1000 to 5000.

Examples of these relatively high molecular weight polyhydroxyl compounds include the polyester polyols, polylactones, polyether polyols, amine or amide based polyether polyols, polycarbonates containing hydroxyl groups, polythioether polyols, and polyacetals described later. Particularly suitable are polypropylene oxide glycol and the polypropylene oxide adduct of trimethylol propane. Examples of polyisocyanates suitable for blocking include isophonone diisocyanate, toluene diisocyanate, hexamethylene diisocyanate, and diphenyl methane diisocyanate. Aromatic polyisocyanates are, however, preferred due to the lower unblocking temperature. The blocking agents are reacted in well known procedures with the polyisocyanate prepolymer to form a blocked polyisocyanate prepolymer. Depending on the structure of the blocked polyisocyantes, the polyisocyanate can be regenerated at a temperature above about 100° C. for futher reaction to form the polyurethane/polyurea elastomers of the present invention. Illustrative of these materials are 4-nonylphenol blocked isocyanate prepolymers available as Desmocap™ from Miles.

Suitable polyamines are those known in the art which contain more than one primary or secondary amino group capable of reacting with isocyanate groups and have molecular weights from about 400 to about 100,000, preferably about 800 to about 20,000, with functionality from 2 to 6, preferably 2 to 3.

Examples include polyoxyalkylene polyamines derived from the amination of polyether polyols with the majority of the hydroxyl groups replaced by amine groups; polyamidoamines derived from dimerized fatty acids; amine terminated polybutadienes; amine terminated polytetrahydrofuran; amine terminated polybutadieneacrylonitrile copolymers; amine terminated polyethers obtained by hydrolysis of isocyanate prepolymers or by hydrogenation of cyanoethylated polyoxpropylene ethers, polyamines containing urea or amide or urethane moieties in their backbone; cyanoethylated amine terminated polyoxypropylene ethers; polysiloxanes containing amino groups; tetramethylene oxide-di-aminobenzoates; polyethers containing aromatic amine end groups; Lewis acid-blocked primary or secondary aliphatic or aromatic amine groups, and mixtures of these.

Useful classes of polyamines include:

(a) The aminopolyethers, which may be prepared by known methods. One such method is the preparation of polyoxyalkylene polyamines by reductive amination of the corresponding polyol (Belgian Pat. No. 634,741 and U.S. Pat. Nos. 3,654,370 and 3,436,359). Other methods include, for example, hydrogenation of cyanoethylated polyoxyalkylene ethers (German Pat. 1,193,671), amination of polypropylene glycol sulfonic acid esters (U.S. Pat. No. 3,236,895), treatment of a polyoxyalkylene glycol with epichlorohydrin and a primary amine (French Pat. No. 1,466,708), or reaction of isocyanate prepolymers with hydroxyl containing enamines, aldimines or ketimines and subsequent hydrolysis (U.S. Pat. No. 3,865,791) or with partially alkylated or alkoxylated polyoxyalkylene amines (U.S. Pat. Nos. 4,465,858 and 4,927,912).

Other suitable polyamines include those containing urea or amide or urethane or ester moieties in their backbone such as those obtained by the hydrolysis of compounds containing isocyanate end groups (German Pat. No. 2,948,419; U.S. Pat. Nos. 4,386,218; 4,525,534; 4,525,590; 4,532,266; 4,540,720; and 4,565,645), or by the reaction of isocyanate prepolyners with excess quantities of diamines (U.S. Pat. No. 3,625,871) or by hydrolysis of N-formyl derivatives of isocyanate prepolymers (U.S. Pat. No. 3,385,829) or by reaction of polyamines with urea (U.S. Pat. No. 4,178,427) or by reaction of excess polyamines and epoxides (U.S. Pat. No. 5,091,574) or by reaction of polyamines with polycarboxylic acids, esters, and/or anhydrides (U.S. Pat. Nos. 4,128,525, 5,064,571, and 5,091,572). Illustrative of these materials are the polyoxyalkylene polyamines available as Jeffamine™ (the D,ED,DU,BuD and T series) from Texaco.

(b) Polyamines containing aliphatic or cycloaliphatic organic compounds, such as polyamidoamines obtained by the polycondensation of polyamines with polymerized fatty acids (such as dimerized linseed oil fatty acid) with variable amine contents based on the choice of the amine. Amine-terminated polyalkadienes can be prepared from dienes which include unsubstituted, 2-substituted or 2,3-disubstituted 1–3 dienes of up to about 12 carbon atoms. Preferably, the dienes have up to about 6 carbon atoms; the substituents in the 2 and/or 3-position may be hydrogen, alkyl groups having 1 to about 4 carbon atoms, substituted or unsubstituted aryl, halogen and the like. Typical of such dienes are 1,3-butadienes, isoprene, chloroprene, 2-cyano-1,3-butadiene, and the like. Further, hydrogenated derivatives of the polyalkadiene polymer may also be useful. In addition, amine terminated polyalkadiene copolymers with acrylonitile or methacrylonitrile in the polymer backbone can be utilized. Illustrative of the above materials are the amine-terminated butadiene/acrylonitrile copolymers available as Hycar™ from BF Goodrich.

(c) Aminoalkyl terminated polydiorganosiloxanes, including polysiloxanes having a molecular weight of about 400 to about 100,000 which contain from about 0.01 to 6 percent, preferably 0.05 to 1% by weight of nitrogen in the form of primary or secondary amino groups. Polysiloxane-containing amino groups include those having structural units corresponding to the following formula:

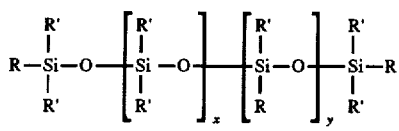

wherein R represents an amino group containing alkyl or aryl radical containing primary, secondary or tertiary amino groups and having a total of 2 to 20 carbon atoms R' independently represent alkyl groups containing 1 to 6 carbon atoms, vinyl groups or phenyl groups Y representing whole or (on a statistical average) fractional number of 0 to 4

X representing a whole or (on a statistical average) fractional number of 10 to 1400

Illustrative of these materials is the difunctional aminopropyl-terminated polydimethylsiloxane formed by reaction of amino propyltrialkoxysilane with octamethyl cyclotetrasiloxane.

(d) Polyethers containing aromatic amine end groups such as anthranilic acid esters prepared by reacting polyhydroxypolyethers with isatoic acid anhydrides (U.S. Pat. Nos. 4,609,684; 4,260,557; 4,194,070; 4,016,143; 3,975,428; and 3,808,250) or the diaminobenzoates of poly (tetramethylene glycol) (U.S. Pat. No. 4,328,322) or other polyether polyols (U.S. Pat. Nos. 2,888,439 and 3,474,126).

Other suitable aromatic polyamines include those containing urea or urethane or amide or ester moieties in their backbone such as those obtained by reaction of isocyanate prepolymers with excess quantities of diamines (U.S. Pat. No. 3,625,871) or by the hydrolysis of compounds containing isocyanate end groups (German Pat. No. 2,948,419; U.S. Pat. Nos. 4,386,218; 4,515,923; 4,525,534; 4,525,590; 4,532,266; 4,540,720; 4,565,645; 4,578,500) or by hydrolysis of N-formyl derivatives of isocyanate prepolymers (U.S. Pat. No. 3,385,829) or by reaction of polyamines with urea (U.S. Pat. No. 4,178,427) or by reaction of polyamines with polycarboxylic acids, esters and/or anhydrides (U.S. Pat. Nos. 4,128,525 and 5,091,572) or by reaction of araliphatic amines with isocyanate containing prepolymers (U.S. Pat. No. 3,625,871) or with polymer grafted polyether polyamines containing terminally aromatic bound amino groups (U.S. Pat. Nos. 4,506,039 and 4,532,266). Illustrative of the above materials are the polytetramethyleneoxide-di-p-aminobenzoates available as Polamine™ from Air Products.

Polyols useful in the invention are liquid or quasi-liquid polyols, with functionality from 2 to about 8, di-or trifunctional polyols being perferred. Suitable polyols have molecular weights of about 400 to about 50,000, preferably about 800 to about 20,000.

Suitable polyols may be selected from polyether polyols based on ethylene oxide, propylene oxide, butylene oxide, tetrahydrofuran, epichlorohydrin or mixtures thereof, ricinoleic acid derivatives, e.g., castor oil; polyester polyols, polyamide or polyesteramide polyols; tertiary amine containing polyols, e.g., ethoxylated or propoxylated amides or amines; polyalkadiene polyols derived from butadiene polymers or copolymers, and hydrogenated derivatives thereof; polyacetals, polycarbonates containing hydroxyl groups; polyhydroxyl (meth)acrylic resins, polythioether polyols, polymer polyols, and the like.

Suitable classes of polyols include:

(a) Polyethers containing at least 2, generally about 2 to about 8, preferably 2 or 3 hydroxyl groups obtained, for example, by polymerizing cyclic ethers, such as ethylene oxide, propylene oxide, hexane oxide, butylene oxide, tetrahydrofuran, styrene oxide or epichlorohydrin on their own, for example, in the presence of Lewis catalysts, such as boron trifluoride, or by the addition of the epoxides, preferably ethylene oxide and propylene oxide, optionally in admixture or successively, with starter components containing reactive hydrogen atoms, such as water, alcohols, ammonia or amines, for example, ethylene glycol, 1,3-propylene glycol or 1,2-propylene glycol, trimethylol propane, glycerol, sorbitol, 4,4'-dihydroxy diphenyl propane aniline, ethanolamine or ethylene diamine. Sucrose polyethers (German Auslegeschrift Nos. 1,176,358 and 1,064,938) and formitol-or formose-started polyethers (U.S. Pat. Nos. 4,187,355 and 4,247,654) may also be used.

The general term polyether polyols also includes polymers referred to as amine-based or amide-based polyols. When propylene oxide and ethylene oxide are utilized to prepare the polyether polyol, it is preferred that the oxypropylene content thereof be at least 60 weight percent, more preferably at least about 70 weight percent and most preferably at least about 80 weight percent. The ethylene oxide is most preferably present in the form of terminal poly (oxyethylene) blocks, constituting about 10 to about 20 weight percent of the polyether. The polyalkylene polyether polyols may have either primary or secondary hydroxyl groups in order to achieve the desired balancing of the nature and reactivity of the isocyanate reactive system in accordance with the present invention. However, in many cases, it is preferred to use at least one polyether polyol which predominately contains primary hydroxyl groups. Illustrative examples are the polypropylene oxide glycols, polypropylene oxide triols or ethylene oxide capped polypropylene oxide triols available either under the Arcol or Pluracol trade names.

(b) Esters of ricinoleic acid with polyhydric alcohols containing at least 2 hydroxyl groups, including mono, di-, and polyesters of ricinoleic acid. These ricinoleic acid polyol esters can be made by methods well known in the art, e.g., by direct esterification of ricinoleic acid with alcohols. A naturally occurring triglyceride of ricinoleic acid is castor oil which has an average functionality of about 2.7. Suitable interesterification products may also be prepared from castor oil and substantially non-hydroxyl-containing, naturally occurring triglyceride oils (U.S. Pat. No. 4,603,188). Illustrative of the above materials is castor oil available from United Catalysts.

(c) Polyalkadiene polyols, prepared from dienes which include unsubstituted, 2-substituted or 2,3-disubstituted 1,3-dienes of up to about 12 carbon atoms. Preferably, the diene has up to about 6 carbon atoms and the substituents in the 2-and/or 3-position may be hydrogen, alkyl groups having about 1 to about 4 carbon atoms, substituted aryl, unsubstituted aryl, halogen and the like. Typical of such dienes are 1,3-butadiene, isoprene, chloroprene, 2-cyano-1,3-butadiene, 2,3-dimethyl-1,2-butadiene, and the like. Hydrogenated derivatives of the polyalkadiene polyols may also be used. A hydroxyl terminated polybutadiene is available from ARCO Chemicals under the designation "Poly-bd R-45HT" and hydroxyl terminated polyisoprenes are available under the "LIR" trade name from Kennedy and Klim.

(d) Polyesters containing hydroxyl groups, e.g., reaction products of polyhydric, preferably dihydric and, optionally, trihydric alcohols with poly-basic, preferably dibasic, carboxylic acid. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be saturated or unsaturated aliphatic or cycloaliphatic, aromatic and/or heterocyclic and may optionally be substituted, for example, by halogen atoms.

Examples of carboxylic acids and their derivatives are succinic acid, adipic acid, suberic acid, azelaic acid, sebacic acid, phthalic acid, isophthalic acid, terephthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids, optionally in admixture with monomeric unsaturated fatty acids, such as oleic acid, terephthalic acid dimethyl ester and terephthalic acid-bisglycol ester.

Examples of suitable polyhydric alcohols are ethylene glycol, 1,2- and 1,3-propylene glycol, 1,4- and 2,3-butylene glycol, 1,6-hexanediol, 1,8-octanediol, neopentyl glycol, 1,4-bis-hydroxymethylcyclohexane, 2-methyl-1,3-propanediol, glycerol, trimethylol propane, 1,2,6-hexanetriol, 1,2,4-butanetriol, trimethylol ethane, pentaerythritol, quinitol, mannitol, sorbitol, formitol, methyl glycoside, diethylene glycol, triethylene glycol, tetraethylene glycol and higher polyethylene glycols, dipropylene glycol and higher polypropylene glycols, dibutyl glycol and higher polybutylene glycols. The polyesters may contain terminal carboxyl groups. Polyesters of lactones, e.g., epsilon-caprolactone, or polyesters of hydroxycarboxylic acids, e.g., omegahydroxycaproic acid, may also be used.

(e) Polythioethers, particularly the condensation products of thiodiglycol alone and/or with other glycols, dicarboxylic acids, formaldehyde, aminocarboxylic acids or amino alcohols. Depending on the co-components, the products can be, for example, polythio mixed ethers, polythioether esters or polythioether ester amides.

(f) Suitable polyacetals, including the compounds obtainable from glycols, such as diethylene glycol, triethylene glycol, 4,4'-diethoxydiphenyldimethylmethane, hexanediol and formaldehyde. Polyacetals suitable for use in accordance with the present invention may also be obtained by polymerizing cyclic acetals such as trioxane (German Offenlegungsschrift No. 1,694,128).

(g) Polycarbonates containing hydroxyl groups obtained, for example, by reacting diols, such as 1,3-propanediol, 1,4-butanediol and/or 1,6-hexanediol, diethylene glycol, triethylene glycol, tetraethylene glycol or thiodiglycol, with diaryl carbonates, for example, diphenyl carbonate, or phosgene (German Auglegeschrift No. 1,915,908 and U.S. Pat. Nos. 3,544,524, 3,867,350 and 4,054,597).

(h) Polyhydroxy (meth)acrylic resins, which are polymers and copolymers of mono esters of (meth)acrylic acid and polyhydric alcohols, useful for making polyester polyols (see (a), infra), e.g., homopolymers and copolymers of hydroxyethyl (meth)acrylate, hydroxypropyl (meth) acrylate, and the like. Illustrative of such compounds are G-cure™ acrylic resin available from Henkel Corp., Minneapolis, Minn., Desmophen™ A resins available from Mobay Corp., Pittsburgh, Pa., and hydroxyl functional Acryloid™ resins, available from Rohm and Haas, Philadelphia, Pa., and the like.

(i) Polyester amides and polyamides, including the predominantly linear condensates obtained, for example, from the reaction of polybasic saturated or unsaturated carboxylic acids or their anhydrides with polyhydric saturated or unsaturated amino alcohols, diamines, polyamines and mixtures thereof.

(j) Polyhydroxyl compounds already containing urethane or urea groups and optionally modified natural polyols, such as carbohydrates, for example, starch. Addition products of alkylene oxides with phenol/formaldehyde resins or even with urea/formaldehyde resins may also be used in accordance with the present invention.

(k) Modified polyhydroxyl compounds. Before they are used in the polyisocyanate/polyaddition process, the above-mentioned polyhydroxyl compounds may be modified in various ways. Thus, according to U.S. Pat. No. 3,849,515, a mixture of different polyhydroxyl compounds (for example, a polyether polyol and a polyester polyol) may be condensed by etherification in the presence of a strong acid to form a relatively high molecular weight polyol which is made up of different segments attached through ether bridges.

(l) Polyhydroxyl compounds containing high molecular weight polyadducts and polycondensates or prepolymers in a finely dispersed or dissolved form, e.g., a dispersion polymer polyol, a grafted copolymer polyol, a solution polymer polyol, or blends thereof. Polyhydroxyl compounds such as these are obtained, for example, by carrying out polyaddition reactions (for example, reactions between polyisocyanates and amino-functional compounds) and polycondensaton reactions (for example, between formaldehyde and phenols and/or amines) in situ in the above-mentioned compounds containing hydroxyl groups (U.S. Pat. Nos. 3,325,421; 4,089,835; 4,093,569; 4,293,470; 4,296,213; 4,301,262; 4,310,448; 4,324,716; 4,374,209; 4,761,434; 4,766,239 and 5,068,280). It is also possible, however, to mix an aqueous polymer dispersion with a polyhydroxyl compound and subsequently to remove the water from the resultant mixture (U.S. Pat. No. 3,869,413). Polyhydroxyl compounds can also be modified by vinyl polymers of the type obtained, for example, by polymerizing styrene and acrylonitrile in the presence of polyethers (U.S. Pat. Nos. 3,304,273; 3,383,351; 3,652,639; 3,931,092; 3,953,393; 4,148,840; 4,242,249; 4,390,645; 4,460,715; 4,539,378; 4,797,459; and 5,093,412). Plastics having particularly good flameproof properties are obtained by using polyether polyols modified (German Offenlegungsschrift Nos. 2,644,922 and 2,646,141 and U.S. Pat. No. 4,028,434) by graft polymerization with vinyl phosphonic acid esters and, optionally (meth)acrylonitrile, (meth)acrylamide or hydroxyl functional (meth)acrylic acid esters. Polyhydroxyl compounds into which carboxyl groups have been introduced by radical graft polymerization with unsaturated carboxylic acids and, optionally, other olefinically unsaturated monomers (U.S. Pat. Nos. 4,250,077; 4,207,227; and 4,198,333) may be used particularly advantageously in combination with mineral fillers. Also suitable are epoxy particles (U.S. Pat No. 4,789,470) and melamine, urea or urea/melamine blend particles dispersed in a polyol (U.S. Pat. Nos. 4,293,657 and 5,087,384). Regardless of the specific polyol used, it is generally preferred to use polyols containing primary hydroxy groups. Mixtures of polymer dispersions and conventional polyols may be employed.

Illustrative examples of polymer polyols include Multranol™ 9151 and 9238, available from Miles Chemical Corporation; Arcol™ 34-28 and 24-32, available from Arco Corporation, and Pluracol™ 994 and 637, available from BASF Agtiengeschelleschaft.

Besides the above polyols and polyamines, lower molecular weight, reactive, chain-extending or crosslinking compounds having molecular weights of about 400 or less and containing at least two isocyanate-reactive hydrogen atoms can also be employed. The amount of chain extending agent required varies with the desired crosslink density in the cured form. Typically, minor amounts are used. Mixtures of agents may also be used. Useful examples include polyhydric alcohols, alkanol amines, primary or secondary aliphatic, cycloaliphatic, aromatic, araliphatic or heterocyclic amines, low molecular weight amine-initiated polyether polyols, ricinoleic derivatives, hydroxyl containing organophosphates, poly-(oxyalkylene)amines, substituted hydrazines and hydrazides, and the like.

Suitable aromatic amine chain extenders include the sterically hindered aromatic polyamines, preferably diamines, which contain linear or branched alkyl substituents or halogen or similar substituents in the ortho position to the amino groups. Aromatic polyamines also include amines in which the amino group is attached to heterocyclic radicals of aromatic character. Examples include 1-methyl-3,5-diethyl-2,6-diamino benzene; 4,4'-methylene bis(2-chloroaniline); 4,4'-diamino-diphenyl sulfone; isobutyl-3,5-diamino-4-chlorobenzoate, NaCl blocked methylene bis(aniline), and the like.

In addition, aliphatic amine-containing chain extenders can be employed. Such compounds include ethylene diamine, methylene-bis(cyclohexyl amine), N,N'-ditertiary-butyl ethylenediamine, amino ethyl piperazine, meta-tetramethylenexylene diamine, and the like. Illustrative of the above materials is 5-amino-1,3,3'-trimethyl cyclohexane-methaneamine (isophorone diamine) Vestamin™ available from Huls.

Low molecular weight hydroxyl terminated compounds can be utilized as chain extenders. Examples of such polyols are N,N-bis(2-hydroxypropylaniline, 1,6-hexanediol tripropyleneglycol, trimethyol propane, 1,4-dihydroxyl cyclohexane, diethanolamine, 1,4-bis (hydroxyethylpiperazine, and the like. It is also possible to use diols containing additional groups, for example, bis-(2-hydroxylpropyl)-isophthalate, polycaprolactone glycol, 1,6-hexamethylene-bis-(2-hydroxylethylurethane), 4,4'-diphenylmethane-bis-(2-hydroxylethyl urea), ethylene glycol mono-ricinoleate, and the like. Illustrative of the above materials are diethyl-N,N-bis(2-hydroxylethyl) amino methylphosphonate, Fyrol™, available from Akzo; pentaethrythritol monoricinoleate, Conacure™ available from Conap; propylene oxide adduct of trimethylolpropane, Pluracol™, available from BASF; and polyethylene or polypropylene oxide adducts of ethylene diamine, also available under the Pluracol™ or Quadrol™ trade name.

Preferred elastomers may also contain a plasticizing system having one or more extenders or plasticizers. The plasticizing system is preferably selected so as to be essentially inert with polyurethane/polyurea reaction products and substantially non-exuding.

Useful plasticizers include aliphatic, naphthenic, and aromatic petroleum based hydrocarbon oils; cyclic olefins (such as polycyclopentadiene), vegetable oils (such as linseed oil, soybean oil, sunflower oil, and the like); saturated or unsaturated synthetic oils; polyalphaolefins (such as hydrogenated polymerized decene-1), hydrogenated terphenyls, pine oil or coal tar or other terpene derivatives, polypropylene oxide mono and di-esters, cyclopentadiene copolymers with fatty acid esters, phosphate esters and mono-, di-, and poly-esters, (such as trimellitates, phthalates, benzoates, fatty acid ester derivatives, castor oil derivatives, fatty acid ester alcohols, dimer acid esters, glutarates, adipates, sebacates, polymeric polyesters, rosin esters, acrylate esters, epoxidized fatty acid esters, and the like) and mixtures thereof. The elastomer preferably comprises about 5 to about 60 weight percent of plasticizer and more preferably comprises about 10 to about 60 weight percent of plasticizer.

Flame retardancy of the elastomers can be improved by the use of halogen and/or phosphorus containing compounds, for example, halogenated phosphate or polyphosphate esters, halogenated organic phosphonates, and halogenated hydrocarbons. These flame retardants can be employed along with hydroxyalkyl phosphonate esters and/or appropriate fillers to impart the desired degree of fire retardancy. Illustrative of the above materials are polyalphaolefins available from Emery Chemical under the Emery trade name, tri-octyl trimellitate available from Nuodex under the Nuoplaz™ trade name, glyceryl tri(acetyl ricinoleate) available under the Flexricin™ trade name from CasChem, trixylenenylphosphate available from FMC under the Kronitex™ trade name, and soybean oil from Spencer-Kellogg.

Any conventional catalyst used in the preparation of polyurethanes may be employed herein. To facilitate the reaction from about 0.005% to about 5.0%, preferably 0.05 to 2.5% by weight of the total reactants of catalyst is added. Suitable catalysts include organometallic chelates, alcoholates, phenolates, and salts of organic acids, tertiary amines, organic tin compounds, bicyclic amidines, silaamines, acidic metal salts of strong acids, tertiary phosphines, alkali and alkali earth metal hydroxides, and the like, and combinations thereof.

Exemplary organometallic catalysts include catalytically active compounds of tin, iron, mercury, bismuth, zinc, manganese, lead, copper, cobalt, titanium, antimony, cadmium, aluminum, nickel, cerium, vanadium, and the like. Illustrative of the above compounds would be stannous octoate, bismuth neodecanoate, lead naphthenate, phenylmercuric benzoate, lead ethylhexanoate, and ferric acetyl acetonate. Suitable organic tin compounds include tin (II) salts of carboxylic acids such as tin ethylhexanoate and tin laurate and the tin (IV) compounds, such as dibutyl tin dilaurate, dibutyl tin oxide, dimethyl-tin (IV)-bis-thiolauryl, dibutyl tin-bis-thioglycolic acid octyl ester, and the like.

Useful tertiary amines include, for example, N-methyl morpholine, bis(2-dimethylaminoethyl) ether, 1-methyl-4-dimethylaminoethyl piperazine, dimetyl benzylamine, triethylamine, 1,8-diazabicyclo(5,4,0)-undec-7-ene (DBU) and salts thereof, 1,4-diazabicyclo(2,2,2) octane, triethylene diamine, and the like.

Preferred elastomers of the invention also contain hollow microspheres made of silicate, phenolic, glass, epoxy, vinylidene chloride copolymers, flyash, carbon, clay and the like. They must be roughly spherical, ranging in particle size from about 0.5 to about 300 microns. The microspheres may be glass, e.g., Scotchlite™, available from Minnesota Mining and Manufacturing Company (3M); polymeric, e.g., Expancel™ 551DE, available from Nobel Industries, UCAR microballoons, available from Union Carbide Corp., and Dualite™ M6001AE, available from Pierce and Stevens Corp.; or ceramic, e.g., Zeeosphere™ X-40, manufactured by Zeelan Industries. Such microspheres may also be treated with a coupling or wetting agent such as a silane, e.g., 3-glycidoxypropyl trimethoxy silane, or an organochromium or titanium or zirconium complex to enable the resin to effectively wet the microspheres.

Additional fillers or combinations of fillers may also be present, such as glass fibers, graphite fibers, fibrous materials emanating from an organic polymer, carbon black, mica, aluminum oxide hydrates, various silicates or carbonates or clays, fumed silica and the like. The term "filler" is used herein to include all solid additives including particulate matter or fibrous matter, present in the composition. Illustrative of the above materials is a fumed silica available under the trade name Cab-O-Sil™ from Cabot.

In one embodiment, expandable sealants may be made from compositions of the invention by adding expandable microspheres to the composition. The sealant may be a one-part sealant which is activated by the application of heat, or it may be a two-part sealant which exotherms upon reaction, providing the necessary heat to cause expansion of the microsphere. Such sealants are especially useful as sealants in devices which have heated process steps. The unexpanded encapsulant can be placed against one side of an area to be filled prior to the heated process step. As the device is heated, the elastomer sealant will expand to fill the area as desired. In one application, the elastomer is placed inside an automobile body where sealing is desired. A small amount is placed in a bead against the wall or seam. When the automobile is subjected to heat during the painting process, the seal will expand to fill the area and seal the seam.

Expandable microspheres useful in such an embodiment include those available as Expancel™ "WU" or "DU" microspheres from Nobel Industries, (designating whether the unexpanded microspheres are wet or dry), including Expancel™ 642 DU,820 DU, 820WU and the like, providing the Expancel™ "WU" grades are dried before use to remove the moisture.

Although the crosslinking reactions to prepare the elastomeric compositions of the present invention are preferably conducted at or near ambient temperature, it should be obvious to one skilled in the art that the reaction rate may be accelerated, if desired, by the application of elevated temperatures, or necessary if blocked isocyanates or expandable microspheres are used.

It is also possible to add other additives, such as wetting agents, UV absorbers, mold release agents, drying agents, such as molecular sieves, fungicides, oxidation preventatives or any other additive as necessary. As oxidation preventatives, there can be used hindered phenols, for example, Irganox™ 1010, Tetrakis methylene(3,5-di-tert-butyl-4-hydroxyhydrocinnamate)methane, and Irganox™ 1076, Octadecyl 8 (3,5-tert-butyl-4-hydroxyphenol) propionate, all available from the Ciba-Geigy Company.

The above mentioned polyisocyanates, polyamines, chain extenders, polyols, polymer polyols, catalysts, hollow microspheres, fillers, plasticizers are not to be construed as conclusive of all acceptable materials falling within the scope of this invention. They are merely cited as examples. Those skilled in the art will readily see that there are other materials which will have the effect noted in the examples which follow. Therefore, it is within the ability of those skilled in the art to identify materials to obtain a particular polyurethane/polyurea sealant as taught by this invention to meet the desired criteria for a particular application.

In order to make elastomers of the invention, the isocyanate reactive blend is mixed together. Other additives, fillers and the catalyst are mixed. The isocyanate is then added to the blend and the elastomer is then cured, either at ambient temperature or elevated temperature, as desired.

Elastomers of the present invention are useful as sealants, end seals, coatings, vibration dampening devices, sound attenuation devices, bushings, sleeves, gaskets and the like. Elastomers having low viscosities are also useful as encapsulants and the like, especially in the electronics and telecommunications fields, e.g., in electrical and signal transmission devices.

In use for signal transmission devices, the elastomer is molded into the desired configuration or poured into a protective housing, and cured under the conditions required for the specific isocyanate component and isocyanate-reactive component used.

The following examples are for illustrative purposes only, and are not limiting to the scope of the invention. Variations within the claimed scope may easily be rendered by one skilled in the art. All parts, percents, and ratios are by weight unless otherwise indicated. Where a particular test was not run in a particular example, this is indicated by a dashed line.

Test Methods

Shore OO Hardness

Shore OO hardness was tested according to the American Society of Test Methods, Test Method "D2240".

Tensile Strength and Elongation

Tensile Strength and elongation were measured according to ASTM Test Method "D-412".

One-Quarter cone Hardness

Hardness was tested using ASTM Test Method "D1403".

Heat Aging

Dry heat aging was tested by heating a thin polymer slab for 18 hours on a Teflon™ coated plate to 104.4° C. (220° F.) in a vented oven. Syneresis or its absence was observed visually, and dumbells were then cut for elongation testing.

Glossary

The following glossary lists the commercially available components used in the following examples. The function of each component is also listed. Function of the component is defined as follows:

| Function | Abbreviation |
|---|---|
| Isocyanate | I |
| Blocked isocyanate | BI |
| Polyamine crosslinking agent | PACA |
| Alcohol Crosslinking Agent | ACA |
| Plasticizer | P |
| Polymer Polyol Crosslinking Agent | PPCA |
| Microsphere filler | M |
| Microsphere filler, expanding | MEF |
| Filler | F |
| Catalyst | C |
| Antioxidant | A |

| MATERIAL | DESCRIPTION | AVERAGE EQUIVALENT WEIGHT | SOURCE | FUNCTION |
|---|---|---|---|---|
| Vestanat IPDI | Isophorone-diisocyanate (3-isocyanato methyl-3,5,5,-trimethylcyclohexyl-isocyanate). | 111 | Huls | I |
| Mondur CD | Carbodiimide derivative of 4,4'-diphenylmethane diisocyanate | 144 | Miles | I |
| Arcol LHT-34 | Polypropylene oxide adduct of glycerol, 5000 molecular weight triol | 1660 | Arco | ACA |
| Arcol PPG 2025 | Polypropylene oxide glycol, 2000 molecular weight diol | 1000 | Arco | ACA |

-continued

| MATERIAL | DESCRIPTION | AVERAGE EQUIVALENT WEIGHT | SOURCE | FUNCTION |
|---|---|---|---|---|
| Pluracol PEP500 | Polypropylene oxide adduct of pentaerythritol, 500 molecular weight tetrol | 125 | BASF | ACA |
| USP Castor Oil | Vegetable oil of about 70% glycerin triricinolein and about 30% glycerol diricinolein mono-oleate or monolinoleate and hydroxy functionality of about 2.7 | 344 | United Catalyst | ACA |
| Poly bd R45HT | Hydroxyl terminated polybutadiene (about 60% trans-1,4, 20% cis-1,4, and 20% 1,2-vinyl) with average molecular weight of about 2900 and hydroxyl functionality of about 2.5 | 1200 | Atochem | ACA |
| Arcol PPG425 | Polypropylene oxide glycol, 425 molecular weight diol | 213 | Arco | ACA |
| Pluracol TP440 | Polypropylene oxide adduct of trimethylolpropane 423 molecular weight diol | 141 | BASF | ACA |
| BiCat 8 | Bismuth/Zinc Neodecanoate | N/A | Shephard | C |
| Polycat SA-102 | 2-Ethyl hexanoic acid salt of DBU (1,8-diazo-bicyclo (5.4.0) undecene-7) | N/A | Air Products | C |
| Polycat 33-LV | 33% solution of 1,4-diazobicyclo(2.2.2) octane | N/A | Air Products | C |
| Dabco T-12 | Dibutyl tin dilaurate | N/A | Air Products | C |
| Quadrol | Tetrkis (2-hydroxyl propyl) ethylene diamine with average molecular weight of 292 and four secondary hydroxyls | 72.9 | BASF | ACA |
| Hatcol DOP | Di-2 ethylhexyl phthalate | N/A | Hatco | P |
| Desmocap 11A | 100% solids 4-nonylphenol blocked isocyanate prepolymer with 2.6 average functionality with 2.4% available isocyanate | 1750 | Miles | BI |
| Desmocap 12A | 100% solids 4-nonylphenol blocked isocyanate prepolymer with 2.0 average functionality with 1.7% available isocyanate | 2470 | Miles | BI |
| Cyanamid TMXDI (meta) | Meta-tetramethylxylylene diisocyanate- | 122 | Cyanamid | I |
| Isonate 143L | Uretonimine modified diphenyl-methane diisocyanate | 179 | Dow | I |
| Conacure AH-35 | Hydroxyl terminated tetrafunctional polyol based on castor oil | 202 | Conap | ACA |
| Fyrol 6 | Diethyl N,N-bis(2-hydroxyethyl) amino methylphosphonate | 127 | Akzo | ACA |
| LIR-503 | Hydroxyl functional liquid polyisoprene with an average functionality of about 2.5 and an average molecular weight of about 25,000 | 10,000 | Kennedy and Klim | ACA |
| Desmodur W | 4,4' methylene-bis(cyclohexyl) isocyanate, hydrogenated MDI or $H_{12}$MDI | 132 | Miles | I |
| Jeffamine D2000 | Polypropylene oxide diamine of about 2000 molecular weight | 514 | Texaco | PACA |
| Jeffamine T3000 | Polypropylene oxide triamine of about 3000 molecular weight | 500 | Texaco | PACA |
| Jeffamine T5000 | Polypropylene oxide triamine 5000 molecular weight | 833 | Texaco | PACA |
| Polamine 1000 | Polytetramethylene oxide-di-p-aminobenzoate. Average molecular weight of about 1200 | 334 | Air Products | PACA |
| Potamine 650 | Polytetramethylene oxide-di-p-aminobenzoate. Average molecular weight of about 820 | 205 | Air Products | PACA |
| PDMS Diamine | Polydimethylsiloxane diamine. Average molecular weight of about 20,000 | 5000 | 3M | PACA |
| Vestamin IPD | Isophorone diamine (cyclohexane-methenamine, 5-amino-1,3,3-trimethyl) Average molecular weight about 170.4 | 42.6 | Huls | PACA |
| Hycar 1300 x 21 | Difunctional secondary amine terminated butadiene acrylonitrile copolymer. Average molecular weight of about 2400 | 1200 | BF Goodrich | PACA |
| Multranol 9151 | Polyurea dispersion in ethylene oxide capped polypropylene oxide triol | 2003 | Miles | PPCA |
| Multranol 9283 | Polyurea dispersion in ethylene oxide capped polypropylene oxide triol - Polymer polyol | 2003 | Miles | PPCA |
| Arcol Polymer Polyol 24-32 | Dispersion of 10% polyacrylonitrile/10% polystyrene in ethylene oxide capped polypropylene oxide diol | 1753 | Arco | PPCA |
| Arcol Polymer Polyol 34-28 | Dispersion of 11% polyacrylonitrile/10% polystyrene in ethylene oxide capped polypropylene oxide triol | 2003 | Arco | PPCA |
| Pluracol Polyol 973 | Dispersion of 30% polyacrylonitrile/polystyrene in ethylene oxide capped polypropoxylated glycerin triol - polymer polyol | 2244 | BASF | PPCA |
| Pluracol P1010 | Polypropylene oxide diol | 525 | BASF | ACA |
| Pluracol 355 | Polyethylene oxide capped ethylene diamine -Tetrol | 125 | BASF | ACA |
| Arcol PPG - 1025 | Polypropylene oxide glycol - Diol | 494 | Arco | ACA |
| Arcol Polyol 11-27 | Ethylene oxide capped polypropylene oxide triol | 2078 | Arco | ACA |
| Arcol LHT 42 | Polypropylene oxide triol | 1385 | Arco | ACA |
| Arcol LHT 28 | Polypropylene oxide triol | 2003 | Arco | ACA |
| Irganox 1076 | Octadecyl 8(3,5-t-butyl-4-hydroxylphenyl) propionate - antioxidant | N/A | Ciba-Geigy | A |
| Soybean Oil | Supreme soybean oil | N/A | Spencer-Kellogg | P |
| Emery 3006 | Polyalphaolefin, 6 cst fluid | N/A | Henkel | P |
| Nuoplaz 6959 | Tri-octyl trimellitate (TOTM) | N/A | Nuodex | P |
| Flexricin P-8 | Glyceryl tri(acetyl ricinoleate) | N/A | CasChem | P |
| Escopol R-020 | Polycyclopentadiene | N/A | Exxon | P |
| Emery 2900 | Dioctyl dimerate | N/A | Emery | P |
| LVI 450 | Napthenic oil, aniline pt 195 | N/A | Shell | P |
| Kronitex TXP | Trixylenylphosphate | N/A | FMC | P |
| Scotchlite ™ GB B23/500 | Hollow glass microspheres of particle size 10–200 microns having a density (by water displacement) of about 0.23 gm/cc | N/A | 3M Co. | M |
| Dualite M6001AE | Hollow composite polymeric microspheres coated with calcium carbonate of about 50 micron particle size having a density of about 0.13 gm/cc | N/A | Pierce and Stevens | M |
| Expancel 551 DE | Hollow expanded microspheres composed of vinylidene chloride/acrylonitrile copolymer of about 30 microns having a density of about 0.02-0.036 gm/cc | N/A | Nobel Ind. | M |
| Expancel 551 DU | Hollow unexpanded microspheres composed of a vinylidene chloride/acrylonitrile copolymer of about 10 microns, containing a blowing agent, isobutane, that | N/A | Nobel Ind. | MEF |

| MATERIAL | DESCRIPTION | AVERAGE EQUIVALENT WEIGHT | SOURCE | FUNCTION |
|---|---|---|---|---|
| Expancel 461 DU | expands to about 35 microns at about 142–150° C. Hollow unexpanded microspheres composed of a vinylidene chloride/acrylonitrile copolymer of about 10 microns, containing a blowing agent, isobutane, that expands to about 35 microns at about 144–152° C. | N/A | Nobel Ind. | MEF |
| Cab O Sil M5 | Fumed silica | N/A | Cabot | F |
| DDI 1410 | Aliphatic diisocyanate based on C36 dimerized fatty acid | 300 | Henkel | I |

EXAMPLES

Elastomer Making Procedure

The same general procedure was followed for all of the examples. The isocyanate reactive blend was prepared and mixed from the stated polyamines, polyols, catalysts, microspheres, fillers, etc. The isocyanate was then added to the blend, and the reactants were quickly mixed mechanically and poured into a mold. The materials were then cured under one of several conditions. Certain materials were cured overnight at ambient room temperature. This was designated as Cure "A".

To speed the curing, some molds were heated for one and one half hours at 76.7° C. (170° F.), and then allowed to sit overnight. This was designated as cure "B".

Finally, for examples 13–18, which involved blocked isocyanates, the molds were placed in a vented oven and heated for forty-five minutes at 124° C. (256° F.). This was designated cure "C".

All microspheres or fillers were dried at least 18 hours at 71.1° C. (160° F.).

Comparative Examples C1–C7

In U.S. Pat No. 4,722,946, it was taught that only liquid products or those with "chewing gum" consistency are obtained at isocyanate indices below 100 with polyisocyanates and isocyanate reactive mixtures comprising linear polyols. Products were made using the elastomer making procedure listed above. Even with the use of branched polyols, only liquid or "chewing gum" consistency products were obtained at isocyanate indices below 65. (See examples 8, 15, 20, 33, and 43.) Solid viscoeleastomers were not produced at isocyanate indices below the limits.

In order to confirm the results, the comparative examples C1–C7 in Table I were produced. Isocyanate-reactive mixtures were reacted with both aromatic and aliphatic polyisocyanates using various catalysts at isocyanate indices of 50 or below. The various polyols used in these experiments had functionalities ranging from 2 to 4, and thus were linear and branched, with primary and secondary alcohols having varying molecular weights. None of the comparative examples yielded solid elastomers, rather viscous liquids were formed in all cases.

Examples 1–37

Examples 1–37 were made according to the above described procedure. In contract to the foregoing comparative examples, surprisingly useful viscoelastic elastomers were obtained at isocyanate indices below 65 and even at very low isocyanate indices when a polyamine was included in the isocyanate reactive mixture. Useful polyamine-containing elastomers were produced not only with completely branched isocyanate reactive mixtures, but also with completely linear isocyanate reactive mixtures, and isocyanate reactive mixtures containing both linear and branched compounds.

Elasticity remained even after dry heat aging of the elastomers at about 104° C., and no syneresis occurred under those conditions.

Elastomers containing hollow microspheres yielded lightweight elastomers which can be shaped into articles, used as sealants or encapsulants in and around electrical devices, environmentally sealed devices, and the like for applications in the electrical, telecommunications, automotive fields, and the like.

As can be seen in Table II, Example 1, when a polyamine was included with the same polyol ingredients as Comparative Example C2 of Table I, (Example 8 of U.S. Pat. No. 4,722,946), a hard elastomer having a Shore OO hardness of above 60 resulted. Likewise, a similar value for hardness was obtained with a diamine and polymer polyol in Example 2. The linear/branched NH and OH ratios by equivalent for Examples 1 and 2 were below 1.00/0.5.

Example 3 demonstrates an elastomer from a completely linear isocyanate reactive mixture having an isocyanate index of about 40. Again a solid elastomer having good properties was formed, rather than a viscous liquid as the prior art would indicate from such as system.

Example 4 was produced with an all branched isocyanate reactive mixture having the polyamine added to the identical polyol ingredients of Comparative Example C4. Elastomers were also formed from a polymeric amine and the polyol ingredients of Comparative Examples 3 and 5 and the properties are demonstrated as Examples 5 and 6 in Table II.

Tables III to VIII show elastomers made from varying systems in order to demonstrate the broad nature of the invention. Elastomers are formed from completely linear isocyanate reactive components in Examples 16 and 18 having isocyanate indices of about 24. Various amines are utilized; the usefulness of aliphatic primary diamines is shown in Examples 7, 10, 11, 15, 16, 18, 21 and 28 at varying isocyanate indices from about 25 to 50. Aliphatic secondary amines are utilized in Examples 30 and 37. Examples 1,2,3,8, and 33 use aromatic diamines. Polydimethylsiloxane diamines were used in Examples 9 and 13. Examples of aliphatic triamines are Nos. 4, 5, 6, 12, 14, 17, 19, 20, 22–27, 29, 31, 32, 34 and 35. These examples have isocyanate indices ranging from 13 to about 82.

The Examples also demonstrate the range of polyisocyanates useful in systems of the invention. Aliphatic polyisocyanates are used in Examples 3–12, and 19–37. Examples 1, 2, 13–18, and 34 use aromatic polyisocyanates, and blocked isocyanates are used in Examples 13–18.

Likewise, non-amine isocyanate-reactive components have been varied. Difunctional and trifunctional polymer polyols are employed in Examples 2, 3, 7, 10, 12–21, 23–27, and 30–33. Examples 9, 11 and 21 utilized a tetrol in the formulations.

Varying plasticizers, microspheres and the like were also utilized throughout the examples. Hard elastomeric materials were produced with an isocyanate index as low as about 20 and useful sealing materials were produced below that value with compositions of this invention. Unexpanded hollow polymeric microspheres (Expancel 551 DU in Example 16 and Expancel 461 DU in Example 17) were also expanded during a heat cure with blocked isocyanates to give an expanding sealant as described earlier. Example 16 expanded about twenty percent and Example 17 expanded about twenty-five percent.

TABLE I

| Components | C1 | C2 | C3 | C4 | C5 | C6 | C7 |
|---|---|---|---|---|---|---|---|
| Mondur CD | 12.8 | 15.2 | — | — | — | — | — |
| Vestanat IPDI | — | — | 7.5 | 4.6 | 7.2 | 3.2 | 13.8 |
| Arcol PPG2025 | 59.0 | 62.7 | 67.5 | — | 86.5 | — | 52.8 |
| Arcol PPG425 | 26.2 | — | — | — | — | — | — |
| Pluracol TP440 | — | 20.9 | — | — | — | — | — |
| Castor Oil | — | — | 24.0 | — | — | — | — |
| Poly bd R45HT | — | — | — | 94.4 | — | — | — |
| Pluracol PEP550 | — | — | — | — | 5.3 | — | — |
| Arcol LHT-34 | — | — | — | — | — | 95.8 | — |
| Quadrol | — | — | — | — | — | — | 26.4 |
| Polycat 33LV | 2.0 | 0.4 | — | — | — | — | — |
| Polycat SA-102 | — | 0.8 | — | — | — | — | — |
| BiCat 8 | — | — | 1.0 | 1.0 | 1.0 | 1.0 | — |
| Dabco T-12 | — | — | — | — | — | — | 0.2 |
| Hatco DOP | — | — | — | — | — | — | 6.8 |
| Isocyanate Ratio | 48.8 | 50.4 | 50.5 | 49.1 | 50.3 | 49.9 | 29.9 |
| Polyol ratio: linear/branched (by equivalent) | All linear | 1.00/2.36 | 1.00/1.09 | All branched | 1.00/0.49 | All branched | 1.00/6.86 |
| Result | Viscous Liquid | Viscous Liquid | Viscous Liquid | Viscous Liquid | Viscous Liquid | Viscous Liquid | Viscous Liquid |

TABLE II

| Components | 1 | 2 | 3 | 4 | 5 | 6 |
|---|---|---|---|---|---|---|
| Mondur CD | 20.7 | 8.8 | — | — | — | — |
| Vestanat IPDI | — | — | — | 5.5 | 8.5 | 8.1 |
| Desmodur N-3200 | — | — | 4.9 | — | — | — |
| Arcol PPG2025 | 35.7 | — | — | — | 39.9 | 53.8 |
| Pluracol TP440 | 11.9 | — | — | — | — | — |
| Multranol 9151 | — | 63.1 | — | — | — | — |
| Pluracol 1010 | — | 13.8 | — | — | — | — |
| Arcol Polymer Polyol 24-32 | — | — | 85.5 | — | — | — |
| Poly bd R45HT | — | — | — | 73.7 | — | — |
| Pluracol PEP550 | — | — | — | — | — | 3.3 |
| Polamine 650 | 29.7 | 12.3 | — | — | — | — |
| Polamine 1000 | — | — | 7.6 | — | — | — |
| Jeffamine T3000 | — | — | — | 18.8 | 34.5 | 32.8 |
| Castor Oil | — | — | — | — | 15.1 | — |
| BiCat 8 | 0.2 | 0.1 | 0.15 | 0.3 | 0.3 | 0.3 |
| Irganox 1076 | 1.8 | 1.9 | 1.85 | 1.7 | 1.7 | 1.7 |
| Isocyanate Index | 54.6 | 52.2 | 39.8 | 50.0 | 50.1 | 50.0 |
| NH and OH Ratio linear/branched (by equivalent) | 1.0/0.5 | 1.0/0.4 | All linear | All branched | 1.0/2.8 | 1.0/1.7 |
| Cure | A | A | A | A | B | A |
| Hardness, Shore 00 | 61.6 | 59.0 | 35.0 | 32.0 | 22.2 | 15.0 |
| Hardness, ¼ Cone | 12.2 | 8.6 | 18.6 | 20.9 | 32.8 | 36.7 |
| Density, gm/cc | 0.89 | 1.02 | 0.98 | 0.81 | 0.94 | 0.96 |
| Tensile Strength, N/cm$^2$ | 53.3 | 113.3 | 91.7 | 14.1 | 19.8 | 9.3 |
| (psi) | (75.8) | (161.2) | (130.5) | (20.0) | (28.2) | (13.2) |
| % Elongation, Initial | 918.4 | 383.7 | 429.5 | 314.9 | 687.2 | 813.5 |
| Tear Strength, N/cm | 32.6 | 68.6 | 37.3 | 8.2 | 9.3 | 4.6 |
| (lb/in) | (18.6) | (39.2) | (21.3) | (4.7) | (5.3) | (2.6) |
| After dry heat aging | | | | | | |
| 18 hrs., 104.4° C., % Elongation | 673.8 | 629.2 | 420.4 | 256.0 | 746.6 | — |
| 18 hrs., 104.4° C., Syneresis | None | None | None | None | None | — |

TABLE III

| Components | 7 | 8 | 9 | 10 | 11 | 12 |
|---|---|---|---|---|---|---|
| Desmodur-W | 5.0 | — | — | 5.7 | 6.0 | 3.7 |
| Vestanat IPDI | — | 5.2 | 3.2 | — | — | — |
| Jeffamine D2000 | 12.1 | — | — | 17.2 | 22.7 | — |
| Polamine 1000 | — | 14.0 | — | — | — | — |
| PDMS diamine | — | — | 14.4 | — | — | — |
| Jeffamine T3000 | — | — | — | — | — | 9.0 |
| Pluracol 973 | 57.8 | — | — | 58.3 | — | 42.7 |
| Pluracol P1010 | 13.1 | — | — | — | — | — |
| Castor Oil | — | 17.0 | 36.8 | 13.8 | — | — |
| Multranol 9151 | — | 51.8 | 32.8 | — | — | — |
| Quadrol | — | — | 0.8 | — | 1.6 | — |
| Arcol PPG 1025 | — | — | — | — | 57.7 | — |
| Arcol LHT 42 | — | — | — | — | — | 39.6 |
| BiCat 8 | 0.5 | 0.3 | 0.3 | 0.15 | 0.15 | 0.15 |
| Irganox 1076 | 1.5 | 1.7 | 1.7 | 1.85 | 1.85 | 1.85 |
| 3M GB B23/500 | 10.0 | 10.0 | 10.0 | — | 10.0 | — |
| Expancel 551DE | — | — | — | 3.0 | — | 3.0 |
| Isocyanate Index | 50.6 | 39.9 | 21.0 | 43.0 | 24.7 | 42.7 |
| NH and OH Ratio; linear/branched (by equivalent) | 1.0/0.5 | 1.0/1.8 | 1.0/46.7 | 1.0/1.9 | 1.0/0.1 | All Branched |
| Cure | A | B | B | B | B | B |
| Hardness, Shore 00 | 52.0 | 31.6 | 58.6 | 54.4 | 44.9 | 38.3 |
| Hardness, ¼ cone | 21.0 | 28.5 | 19 | 9.3 | 12.8 | 12.7 |
| Density, gm/cc | 0.72 | 0.65 | 0.71 | 0.56 | 0.75 | 0.57 |
| Tensile Strength, N/cm$^2$ | 14.9 | 11.4 | 23.3 | 64.5 | 17.5 | 26.2 |
| (psi) | (21.2) | (16.2) | (33.1) | (91.8) | (24.9) | (37.3) |
| % Elongation, Initial | 844.6 | 439.5 | 180.2 | 262.5 | 236.7 | 244.0 |
| Tear Strength, N/cm | 14.9 | 12.4 | 22.8 | 45.9 | 10.5 | 17.9 |
| (lb/in) | (8.5) | (7.1) | (13.0) | (26.2) | (6.0) | (10.2) |
| After dry heat aging | | | | | | |
| 18 hrs., 104.4° C., % Elongation | — | — | 283.4 | 272.1 | 384.9 | 257.8 |
| 18 hrs., 104.4° C., Syneresis | — | — | None | None | None | None |

TABLE IV

| Components | 13 | 14 | 15 | 16 | 17 | 18 |
|---|---|---|---|---|---|---|
| Desmocap 11A | 26.1 | — | 23.0 | 24.8 | 29.6 | 23.0 |
| Desmocap 12A | — | 50.0 | — | — | — | — |
| PDMS diamine | 14.9 | — | — | — | — | — |
| Vestamin IPD | — | 0.2 | — | 0.2 | — | 0.2 |
| Jeffamine T3000 | — | 16.2 | — | — | 8.3 | — |
| Jeffamine D2000 | — | — | 12.1 | 10.7 | — | 9.9 |
| Castor Oil | 20.1 | — | — | — | 10.6 | — |
| Multranol 9151 | 26.9 | — | — | — | — | — |
| Arcol Polymer Polyol 24-32 | — | 21.6 | — | 59.3 | — | 54.9 |
| Pluracol 973 | — | — | 59.9 | — | 45.5 | — |
| BiCat 8 | 0.5 | 0.5 | 0.5 | 0.5 | 0.5 | 0.5 |
| Irganox 1076 | 1.5 | 1.5 | 1.5 | 1.5 | 1.5 | 1.5 |
| 3M GB B23/500 | 10.0 | 10.0 | — | — | — | 10.0 |
| Expancel 551 DE | — | — | 3.0 | — | — | — |
| Expancel 551 DU | — | — | — | 3.0 | — | — |
| Expancel 461 DU | — | — | — | — | 4.0 | — |
| Isocyanate Index | 19.9 | 41.0 | 25.8 | 23.6 | 25.0 | 23.5 |
| NH and OH Ratio; linear/branched (by equivalent) | 1.0/24.1 | 1.0/0.5 | 1.0/1.1 | All linear | All branched | All linear |
| Cure | C | C | C | C | C | C |
| Hardness, Shore 00 | 48.2 | 53.4 | 25.5 | 30.4 | 48.8 | 46.0 |
| Hardness, ¼ cone | 24.8 | 10.6 | 17.7 | 16.1 | 9.0 | 13.5 |
| Density, gm/cc | 0.73 | 0.72 | 0.57 | 0.8 | 0.79 | 0.70 |
| Tensile Strength, N/cm$^2$ | 15.5 | 49.6 | 31.9 | 100.9 | 61.2 | 48.2 |
| (psi) | (22.1) | (70.5) | (45.4) | (143.5) | (87.1) | (68.5) |
| % Elongation, Initial | 288.3 | 716.2 | 573.0 | 924.5 | 728.5 | 889.2 |
| Tear Strength, N/cm | 19.4 | 28.5 | 30.6 | 47.8 | 41.7 | 24.9 |
| (lb/in) | (11.1) | (16.3) | (17.5) | (27.3) | (23.8) | (14.2) |

TABLE IV-continued

| Components | 13 | 14 | 15 | 16 | 17 | 18 |
|---|---|---|---|---|---|---|
| After dry heat aging | | | | | | |
| 18 hrs., 104.4° C., % Elongation | 345.1 | 691.3 | 798.5 | 925.1 | 606.4 | — |
| 18 hrs., 104.4° C., Syneresis | None | None | None | None | None | None |

TABLE V

| Components | 19 | 20 | 21 | 22 | 23 | 23 |
|---|---|---|---|---|---|---|
| Vestanat IPDI | 3.0 | 2.4 | 4.8 | — | 5.8 | 4.9 |
| Cyanamid TMXDI (Meta) | — | — | — | 4.6 | — | — |
| Jeffamine T5000 | 14.4 | 11.5 | — | 31.4 | — | — |
| Jeffamine D2000 | — | — | 8.6 | — | — | — |
| Jeffamine T3000 | — | — | — | — | 8.8 | 8.9 |
| Castor Oil | 33.4 | 45.1 | 38.3 | 12.8 | 15.0 | 15.1 |
| Pluracol 973 | 41.2 | 33.0 | — | — | — | — |
| Pluracol 355 | — | — | 2.2 | — | — | — |
| Multranol 9151 | — | — | 34.1 | — | — | — |
| Arcol Polymer Polyol 34-28 | — | — | — | — | 58.4 | 59.1 |
| Arcol Polyol 11-27 | — | — | — | 39.2 | — | — |
| BiCat 8 | 0.2 | 0.5 | 0.2 | 0.15 | 0.15 | 0.15 |
| Irganox 1076 | 1.8 | 1.5 | 1.8 | 1.85 | 1.85 | 1.85 |
| Dualite M6001AE | 6.0 | 6.0 | — | — | — | — |
| 3M GB B23/500 | — | — | 10.0 | 10.0 | 10.0 | 10.0 |
| Isocyanate Index | 20.3 | 13.5 | 26.5 | 40.2 | 57.8 | 48.4 |
| NH and OH Ratio; linear/branched (by equivalent) | All branched | All branched | 1.0/8.5 | All branched | All branched | All branched |
| Cure | B | B | A | B | B | B |
| Hardness, Shore 00 | 21.1 | — | 33.0 | 51.2 | 70.8 | 69.8 |
| Hardness, ¼ cone | 22.4 | 82.3 | 25.5 | 18.6 | 9.0 | 8.6 |
| Density, gm/cc | 0.64 | — | 0.65 | 0.69 | 0.68 | 0.67 |
| Tensile Strength, N/cm² (psi) | 17.6 (25.1) | — | 22.3 (31.7) | 8.9 (12.6) | 62.0 (88.2) | 91.8 (130.6) |
| % Elongation, Initial | 493.0 | — | 541.6 | 440.4 | 214.6 | 305.8 |
| Tear Strength, N/cm (lb/in) | 11.7 (6.7) | — | 17.0 (9.7) | 8.9 (5.1) | 49.7 (28.4) | 55.9 (31.9) |
| After dry heat aging | | | | | | |
| 18 hrs., 104.4° C., % Elongation | — | — | 526.1 | 919.3 | 294.8 | 169.6 |
| 18 hrs., 104.4° C, Syneresis | — | — | None | None | None | None |

TABLE VI

| Components | 25 | 26 | 27 | 28 | 29 | 30 |
|---|---|---|---|---|---|---|
| Vestanat IPDI | 4.0 | 3.0 | 2.1 | — | — | — |
| Desmodur W | — | — | — | 1.4 | — | — |
| DDI 1410 | — | — | — | — | 9.6 | 11.5 |
| Jeffamine T3000 | 8.9 | 9.1 | 9.1 | — | — | — |
| Jeffamine D2000 | — | — | — | 3.5 | — | — |
| Jeffamine T5000 | — | — | — | — | 11.9 | — |
| Hycar 1300 × 21 | — | — | — | — | — | 9.2 |
| Castor Oil | 15.4 | 15.5 | 15.7 | — | — | 16.1 |
| Arcol Polymer Polyol 34-28 | 59.7 | 60.4 | 61.1 | — | — | 51. |
| LIR 503 | — | — | — | 58.8 | — | — |
| Arcol LHT-28 | — | — | — | 28.3 | — | — |
| Poly bd R45HT | — | — | — | — | 65.6 | — |
| Pyrol 6 | — | — | — | — | 0.9 | — |
| BiCat 8 | 0.2 | 0.2 | 0.2 | 0.15 | 0.6 | 0.15 |
| Irganox 1076 | 1.8 | 1.8 | 1.8 | 1.85 | 1.4 | 1.85 |
| 3M GB B23/500 | 10.0 | 10.0 | 10.0 | — | 10.0 | 10.0 |

TABLE VI-continued

| Components | 25 | 26 | 27 | 28 | 29 | 30 |
|---|---|---|---|---|---|---|
| Dualite M6001AE | — | — | — | 6.0 | — | — |
| Isocyanate Ratio | 39.0 | 28.9 | 20.0 | 45.1 | 41.1 | 47.9 |
| NH and OH Ratio linear/branched (by equivalent) | All branched | All branched | All branched | 1.0/5.7 | 1.0/10.1 | 1.0/9.4 |
| Cure | B | B | B | B | B | B |
| Hardness, Shore 00 | 69.6 | 48.0 | — | 12.8 | — | 63.6 |
| Hardness, ¼ cone | 8.4 | 15.9 | 115 | 38.8 | 47.4 | 9.9 |
| Density, gm/cc | 0.68 | 0.67 | — | — | 0.59 | 0.71 |
| Tensile Strength, N/cm$^2$ | 78.1 | 35.9 | — | — | 8.6 | 49.6 |
| (psi) | (111.1) | (51.1) | — | — | (12.2) | (70.5) |
| % Elongation, Initial | 271.2 | 421.6 | — | — | 538.1 | 372.8 |
| Tear Strength, N/cm | 51.0 | 25.5 | — | — | 6.7 | 44.8 |
| (lb/in) | (29.1) | (14.9) | — | — | (3.8) | (26.5) |
| After dry heat aging |  |  |  |  |  |  |
| 18 hrs., 104.4° C., % Elongation | 423.5 | 508.2 | — | — | 356.2 | 408.2 |
| 18 hrs., 104.4° C., Syneresis | None | None | — | — | None | None |

TABLE VII

| Components | 31 | 32 | 33 | 34 | 35 |
|---|---|---|---|---|---|
| DDI 1410 | 6.3 | 5.3 | — | 5.0 | 6.1 |
| Vestanat IPDI | — | — | 3.7 | — | — |
| Isonate 143L | — | — | — | 0.4 | — |
| Jeffamine T3000 | 6.5 | 6.5 | — | — | — |
| Polamine 650 | — | — | 2.7 | — | — |
| Jeffamine T5000 | — | — | — | 6.5 | 6.8 |
| Vestamin IPD | — | — | — | — | 0.2 |
| Polybd R45HT | 22.7 | 23.0 | — | 17.6 | 16.5 |
| Multranol 9238 | 34.5 | 35.2 | 53.5 | — | — |
| Castor Oil | — | — | 10.1 | — | — |
| BiCat 8 | 0.4 | 0.2 | 0.4 | 0.8 | 0.8 |
| Irganox 1076 | 1.6 | 1.8 | 1.6 | 1.1 | 1.1 |
| 3M GB B23/500 | 10.0 | 10.0 | 10.0 | 10.0 | 10.0 |
| Cab O Sil M5 | — | — | — | 3.0 | 3.0 |
| Soybean Oil | 10.8 | 10.8 | — | — | — |
| Emery 3006 | 7.2 | 7.2 | — | 22.2 | — |
| Flexricin P-8 | — | — | 18.0 | — | — |
| Nuodex 6959 | — | — | — | 33.4 | — |
| Escopol R-020 | — | — | — | — | 27.7 |
| Emory 2900 | — | — | — | — | 27.8 |
| Isocyanate Ratio | 42.2 | 35.1 | 48.1 | 82.4 | 75.1 |
| NH and OH Ratio linear/branched (by equivalent) | All branched | All branched | 1.0/0.2 | All branched | 1.0/0.2 |
| Cure | B | B | A | B | B |
| Hardness, Shore 00 | 19.2 | — | 49.3 | 30.6 | 13.4 |
| Hardness, ¼ cone | 30.1 | 86.0 | 17.8 | 21.5 | 28.1 |
| Density, gm/cc | 0.62 | — | 0.64 | 0.63 | 0.61 |
| Tensile Strength, N/cm$^2$ (psi) | 19.2 (27.3) | — | 23.8 (33.9) | 15.7 (22.3) | 9.6 (13.6) |
| % Elongation | 843.7 | — | 510.9 | 134.8 | 388.9 |
| Tear Strength, N/cm (lb/in) | 9.1 (5.2) | — | 20.8 (11.9) | 12.6 (7.2) | 8.4 (4.8) |
| After dry heat aging |  |  |  |  |  |
| 18 hrs., 104.4° C., % Elongation | 801.1 | — | 726.5 | 136.8 | 375.0 |
| 18 hrs., 104.4° C., Syneresis | None | — | None | None | None |

TABLE VIII

| Components | 36 | 37 |
|---|---|---|
| DDI 1410 | 6.5 | 6.5 |
| Hycar 1300 × 21 | 5.2 | 5.2 |
| Poly bd R45HT | 17.8 | 17.8 |
| Conacure AH35 | 0.3 | 0.3 |
| BiCat 8 | 0.8 | 0.8 |
| Irganox 1076 | 1.1 | 1.1 |
| 3M GB B23/500 | 10.0 | 10.0 |
| Drapex 429 | 36.8 | — |
| Shell LVI 450 | 18.5 | 18.5 |
| Kronitex TXP | — | 36.8 |
| Isocyanate Ratio | 97.0 | 97.0 |
| NH and OH Ratio linear/branched (by equivalent) | 1.0/3.8 | 1.0/3.8 |
| Cure | B | B |
| Hardness, Shore 00 | 47.4 | 18.8 |
| Hardness, ¼ cone | 14.6 | 35.5 |
| Density, gm/cc | 0.66 | 0.67 |
| Tensile Strength, N/cm$^2$ (psi) | 31.6 (45.0) | 17.6 (25.1) |
| % Elongation | 158.2 | 153.8 |
| Tear Strength, N/cm (lb/in) | 25.0 (14.3) | 15.9 (9.1) |
| After dry heat aging |  |  |
| 18 hrs., 104.4° C., % Elongation | 150.1 | 140.0 |
| 18 hrs., 104.4° C., Syneresis | None | None |

What is claimed is:

1. A flexible polyurethane/urea elastomer comprising a reaction product of
   a) a polyisocyanate component,
   b) an isocyanate-reactive component containing at least one polyamine selected from the group consisting of amine-terminated butadiene/acrylonitrile copolymers, and at least one polyol selected from the group consisting of polyalkadiene polyols derived from butadiene polymers, butadiene copolymers or hydrogenated derivatives thereof, said reaction product having an isocyanate index from about 15 to about 80, wherein said elastomer contains from about 1 to about 199 equivalent percent active amine hydrogen per isocyanate equivalent.

2. A flexible elastomer according to claim 1 comprising from about 5 percent by weight to about 60 percent by weight of at least one plasticizer selected from the group consisting of polyalphaolefins, cyclic polyolefins, petroleum oils, vegetable oils and esters, said esters being selected from the group consisting of phosphate esters, monoesters, diesters, polyesters, and mixtures thereof.

3. A flexible elastomer according to claim 2 comprising from about 10 to about 60 percent by weight of said plasticizer.

4. A flexible elastomer according to claim 1 further comprising from about 0.005% to about 5% by weight of a catalyst for the reaction of said polyisocyanate component and said isocyanate reactive component.

5. A flexible elastomer according to claim 4 wherein said catalyst is an organobismuth compound.

6. A flexible elastomer according to claim 1 wherein said reaction product has an isocyanate index of less than about 80.

7. A flexible elastomer according to claim 6 wherein said reaction product has an isocyanate index of less than about 65.

8. A flexible elastomer according to claim 1 further comprising from about 10 to about 60 volume percent hollow microspheres.

9. A flexible elastomer according to claim 8 wherein said microspheres are selected from the group consisting of glass microspheres, expanded and unexpanded polymeric microspheres, and ceramic microspheres.

10. A flexible elastomer according to claim 9 wherein said microspheres are glass microspheres.

11. A sealant for a signal conducting device comprising a flexible polyurethane/urea elastomer according to claim 1.

12. A sealant according to claim 11 wherein said reaction product is extended with at least from about 5 to about 60 weight percent of a plasticizer, forming a plasticized sealant which is substantially nonexuding.

13. A sealing gasket suitable for sealing a space between two surfaces comprising the flexible polyurethane/urea elastomer of claim 1.

* * * * *